Oct. 4, 1960 J. W. BRYAN 2,955,197

SELECTED FREQUENCY TRANSISTOR TRANSMITTER

Filed Oct. 9, 1956

2 Sheets-Sheet 1

James W. Bryan
INVENTOR.

BY Clarence A. O'Brien
and Harvey B. Jacobson
Attorneys

SELECTED FREQUENCY TRANSISTOR TRANSMITTER

Filed Oct. 9, 1956 2 Sheets-Sheet 2

James W. Bryan
INVENTOR.

BY Clarence A. O'Brien
and Harvey B. Jacobson
Attorneys 2,955,197

SELECTED FREQUENCY TRANSISTOR TRANSMITTER

James W. Bryan, Rte. 2, Box 828, Fairdale, Ky.

Filed Oct. 9, 1956, Ser. No. 614,891

2 Claims. (Cl. 250—17)

This invention relates to transistorized radio receiver and transmitting circuits employing novel means for controlling the frequency to be transmitted and received. This invention is designed to be utilized in a system as taught in the copending application Serial No. 427,976, filed May 6, 1954, of which this application is a continuation-in-part.

The primary object of the present invention resides in the provision of novel multi-tap transformer coils which may be utilized to select any of a suitable number of available frequencies for transmission or reception eliminating the necessity of complex tuning equipment and capacitor circuits whereby enabling even an untrained person to utilize the equipment.

A further object of the invention resides in the provision of a transmitter which is capable of transmitting at various frequencies without changing the oscillator frequencies utilized or without the use of frequency doubler stages while permitting the frequency of the transmitter to be readily controlled by means of push-button switches or the like.

The construction of this invention features the use of a pair of header oscillators, the operative frequencies of which are rather low so as to keep the transmitter well within the Federal Communications Commission rule which governs use of unlicensed transmitters thereby making this invention suitable for use in local loudspeaker and enunciator broadcasts in auditoriums, theaters, or the like.

A further object of the present invention lies in the provision of a novel receiver employing a wide band radio frequency amplifier and which employs a novel means for shifting the oscillator frequency in order to obtain the desired transmitted signal.

The receiver incorporated in the present invention uses an additive frequency to obtain the desired intermediate frequency and employs transistors in lieu of vacuum tubes enabling the size of the receiver to be kept at a minimum.

Figure 1:
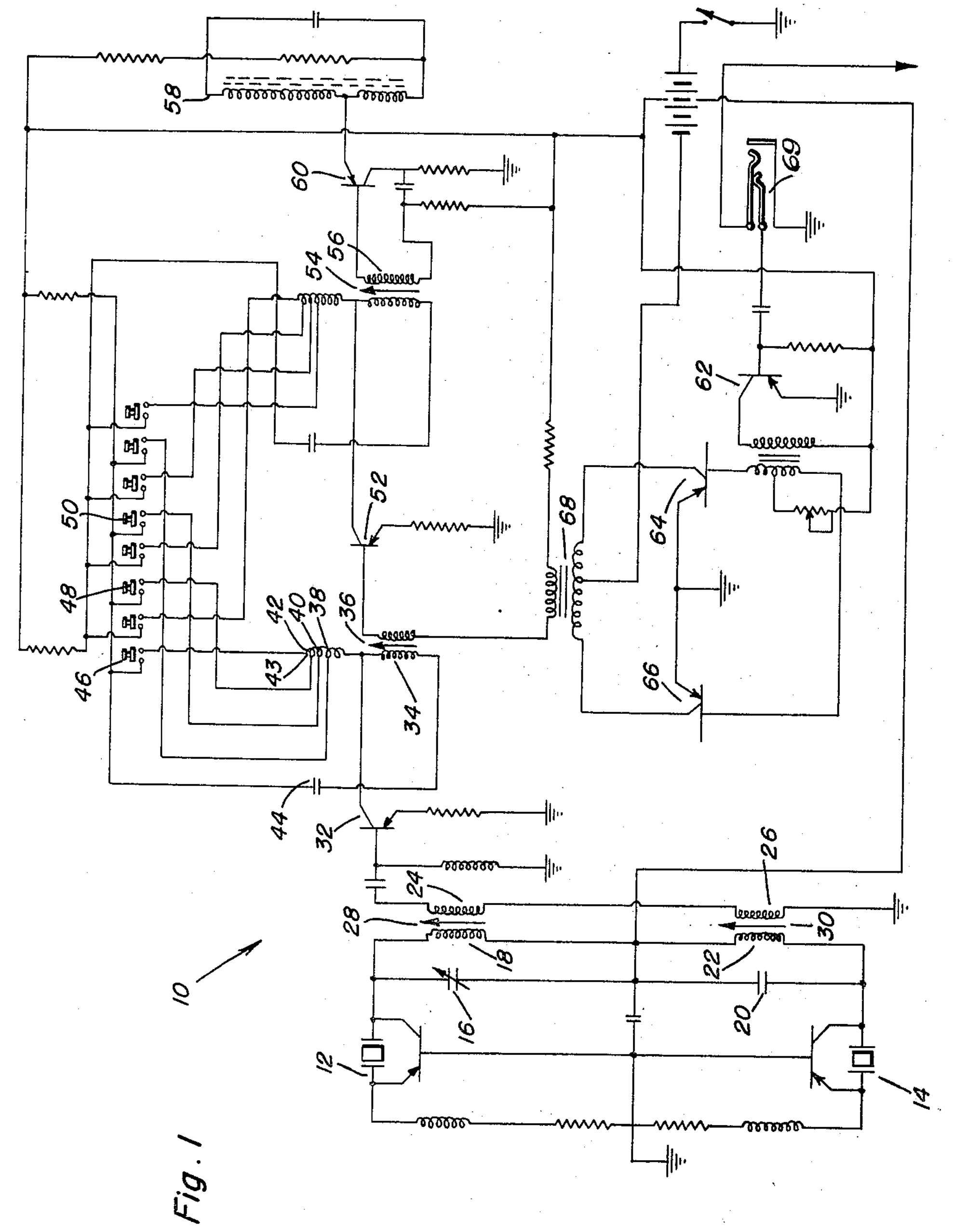
Figure 2:
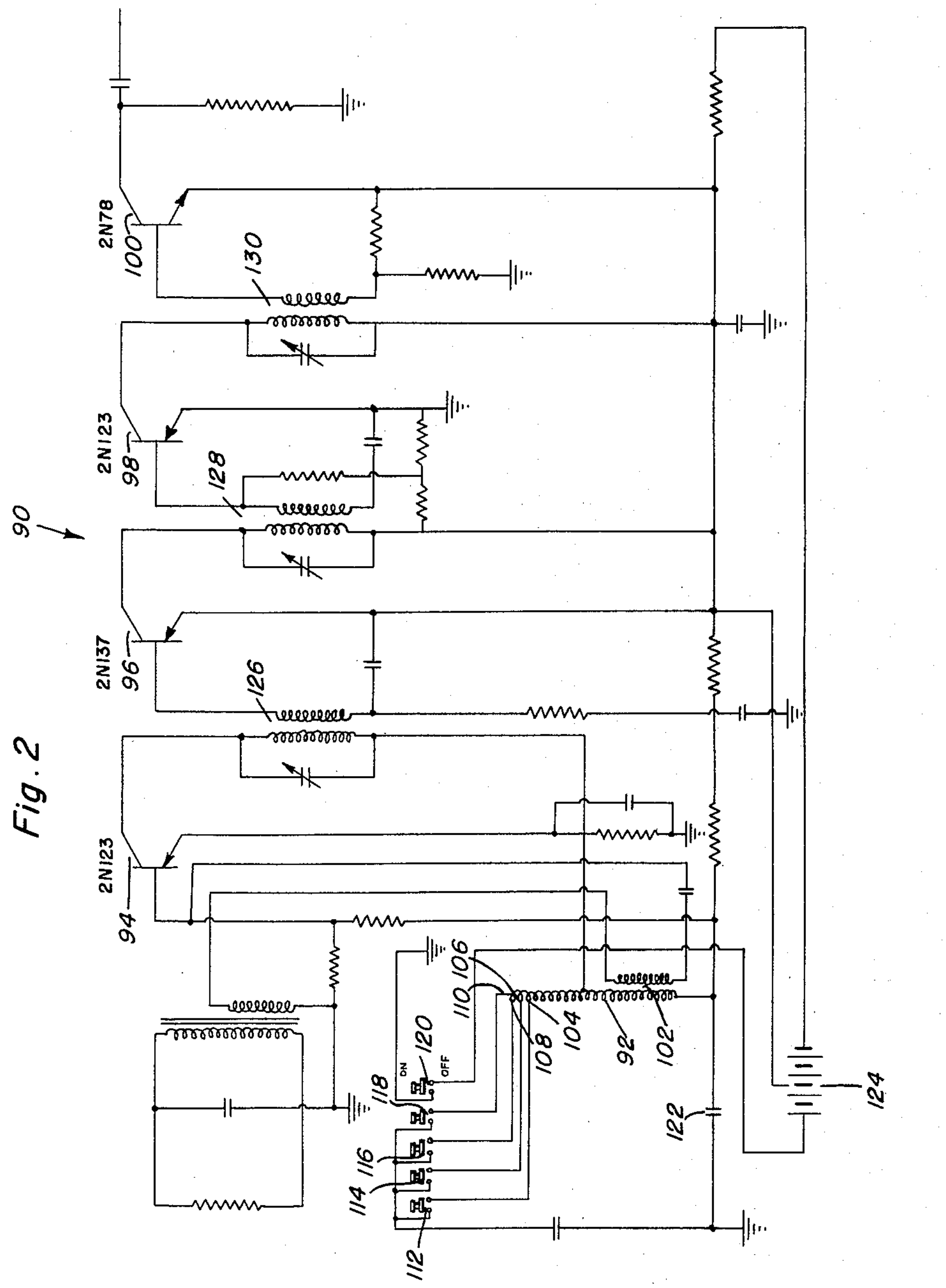

These, together with the various ancillary objects and features of the invention which will become apparent as the following descriptions proceed, are attained by these transistorized circuits designed as a coupling system for use in microphonic pick-up arrangements and the like, preferred embodiments of which have been illustrated in the accompanying drawings, by way of example only, wherein:

Figure 1 is a schematic wiring diagram of the transmitter incorporating the concepts of the present invention; and Figure 2 is a schematic wiring diagram of a receiver employing certain novel arrangements of the present invention.

With continuing reference to the accompanying drawings wherein like reference numerals designate similar parts throughout the various views, and with initial attention directed to Figure 1, wherein there is shown a transmitter circuit generally indicated by reference numeral 10, it will be noted that in lieu of a single oscillator there is provided a pair of oscillators 12 and 14 of conventional transistor components which have different natural frequencies.

The oscillators 12 and 14 are of conventional design and their tank circuits including condenser 16 and impedance coil 18 for the oscillator 12 and condenser 20 and coil 22 for the oscillator 14 are tuned to the fundamental frequency of their respective oscillators. The secondary coils 24 and 26 of transformers 28 and 30 have a combined impedance to match the low base input to the mixer transistor 32. At the collector of the mixer transistor 32 the two oscillator frequencies are mixed and frequencies will then be available in steps of predetermined value dependent upon the fundamental frequencies of the oscillators. The output of the mixer 32 is coupled through the transformer 34 designed through the coil 34 of transformer 36 which is provided with an impedance tap to match the collector impedance of the mixer 32. This coil 34 is further tapped as at 38, 40, 42, 43, to change the inductance reactance to cause the resonate frequency of the circuit of condenser 44 and the coil 34 to tune to the desired frequency to be transmitted. The full coil tap as at 42 has an inductance value with condenser 44 to cause the circuit to resonate in this particular case at the fundamental frequency of the oscillator 12. By switching the tap from tap 43 by opening the push-button switch 46 and closing the push-button switch 48, the circuit may be then made to resonate to the frequency which is the difference of the frequencies between the oscillator 12 and 14. Tap 40 controlled by switch 50 may be at another different frequency which is an increment in a predetermined amount above the other frequencies. By use of the other taps there may be provided a control of the frequencies in predetermined steps up to a point where the harmonic content is too weak for practical use.

There may optionally be provided a buffer amplifier 52 but such is not necessarily needed. It has been found that two stages of radio frequency following the oscillators give ample gain to suit the purposes of this invention. When using only two stages of radio frequency as at the mixer 32 and the amplifier 52, the transformer 54 functions in like manner complementary to the transformer 36.

The secondary coil 56 of transformer 54 has a suitable impedance and acts as a link coupling the ferrite antenna 58 which is tapped for an impedance matching the impedance of the coil 56. With this arrangement a suitable operating distance for the invention is achieved.

However, in the circuit illustrated, the secondary coil 56 couples the desired frequency to the radio frequency output section 60. The output of the radio frequency output section 60 is fed directly to the tapped ferrite rod antenna which is tapped at a suitable impedance to satisfy the collector output impedance of the radio frequency output circuit 60.

The modulator section includes transistors 62, 64, 66 and is of conventional design except for the modulation transformer 68 which must have a secondary impedance to match in this case the base impedance.

The switch 69 being of a closed circuit construction eliminates the need for a separate switch when a conventional cord is being used.

The various component parts used in the transmitter 10 are of standard values and it is to be recognized that the main concept of the invention lies in the utilization of the two oscillators 12 and 14 instead of a conventional signal oscillator and the use of the multi-taps for the composite coils 36 and 38 for the purpose of selecting the desired frequency for transmission.

The receiver utilizing the present invention is generally indicated by reference numeral 90 and is of conventional design for most of the portions thereof. The main differences in the invention lies in the tuning means utilized.

In lieu of a conventional loading coil, a multi-tap coil 92 is provided. It is to be understood that this invention is shown adapted to a four valve circuit employing four transistors 94, 96, 98 and 100 in lieu of conventional electronic tubes. The primary coil 92 of the transformer 102 has a plurality of taps as at 104, 106, 108, and 110 controlled by push-type switches 112, 114, 116, and 118. An on-off control switch 120 is provided for connecting the various components of the receiver to the battery 124 or other suitable source of electrical power. The use of the coil 92 enables a wide band to be covered with the switches 112, 114, 116 and 118 varying the impedance of the loading coil 92 and thus varying the frequency of the amplifier in steps for example, in the order of 50 kc. steps to measure it with the variable frequency of the transmitter.

Condenser 122 serves to isolate the voltage and apply it upon the transistor 94 which serves as a frequency changer. In a tube arrangement in lieu of the transistor 94 a heptode or a pentagrid frequency changer might be utilized. The input signal need not be tuned by condensers or like arrangements as in conventional circuits by the desired frequency is automatically selected through use of the switches 112, 114 and 116 and 118.

Transformer 126 is the first intermediate frequency transformer and feeds the I.F. amplifier transistor 96. This compares to the standard form of intermediate transistor 96. This compares to the standard form of intermediate frequency coupling. The second intermediate frequency transformer 128 feeds the transistor 98. The output transistor 100 is fed by transformer 130 and is coupled to the input of an audio amplifier or the like.

It is to be recognized that the multi-cap coil 92 provides means for shifting the oscillator frequency in order to obtain the desired transmitted signal and if desired an additive frequency may be applied to obtain the desired intermediate frequency.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A transmitter comprising a pair of fixed frequency transistor oscillators, a transistor mixer, each of said transistors having a base, collector, and emitter, the output of said oscillators being applied on said mixer, a multi-tap coil, the output of said mixer being coupled to said multi-tap coil, said multi-tap coil having an impedance tap for matching the coil impedance to the collector impedance of said mixer, an output section, said coil having further taps for connection to said output section for tuning to the desired frequency to be transmitted, switch means for selectively connecting a tapped portion of said coil between said mixer and said output section, said output section being coupled to a modulator section.

2. A transmitter comprising a pair of fixed frequency transistor oscillators, said oscillators being of diverse natural frequencies, a transistor mixer, each of said transistors having a base, collector, and emitter, the output of said oscillators being heterodyned and applied on said mixer, a multi-tap coil, the ouput of said mixer being coupled to said multi-tap coil, said multi-tap coil having an impedance tap for matching the coil impedance to the collector impedance of said mixer, an output section, said coil having further taps connected to said output section for tuning the desired frequency to be transmitted, said output section being coupled to a modulator section.

References Cited in the file of this patent

UNITED STATES PATENTS

| | | |
|---|---|---|
| 1,874,958 | Gebhard | Aug. 30, 1932 |
| 1,988,960 | Ports | Jan. 22, 1935 |
| 1,993,395 | Beers | Mar. 5, 1935 |
| 2,063,248 | Hansell | Dec. 8, 1936 |
| 2,272,068 | Pollack | Feb. 3, 1942 |
| 2,505,511 | Vogel | Apr. 25, 1950 |
| 2,604,585 | Parker | July 22, 1952 |
| 2,679,005 | Bataille et al. | May 18, 1954 |
| 2,750,496 | Horowitz et al. | June 12, 1956 |
| 2,771,547 | Bell et al. | Nov. 20, 1956 |
| 2,773,187 | Regnier | Dec. 4, 1956 |
| 2,850,631 | Tillman | Sept. 2, 1958 |
| 2,894,208 | Crow | July 7, 1959 |

FOREIGN PATENTS

| | | |
|---|---|---|
| 542,277 | Great Britain | Jan. 2, 1942 |